July 22, 1969    J. R. SCHNEIDER    3,457,169
METHOD AND APPARATUS FOR SEPARATION
OF OIL FROM AQUEOUS LIQUIDS
Filed March 3, 1965

INVENTOR.
JOHN RUSSELL SCHNEIDER
BY
ATTORNEYS

United States Patent Office 3,457,169
Patented July 22, 1969

3,457,169
METHOD AND APPARATUS FOR SEPARATION OF OIL FROM AQUEOUS LIQUIDS
John R. Schneider, Belvedere, Calif., assignor to De Laval Turbine Inc., Trenton, N.J., a corporation of Delaware
Filed Mar. 3, 1965, Ser. No. 436,790
Int. Cl. B04d *11/04*
U.S. Cl. 210—23                                32 Claims

ABSTRACT OF THE DISCLOSURE

A method and apparatus for the separation of non-emulsified suspended oil droplets from an emulsion of an oil as the disperse phase in an aqueous continuous phase, in which the emulsion containing the nonemulsified droplets is passed through a separating medium providing flow passages bounded by surfaces of an oil-retaining water-repellent material. The flow passages in the separating medium are of a short length in the direction of flow so that oil after accumulation in the passages flows therefrom in the form of droplets of a size larger than those in the original liquid. The effluent from the separating medium is delivered to a receptacle where gravity flotation of the larger droplets is effected.

---

Figure 1:
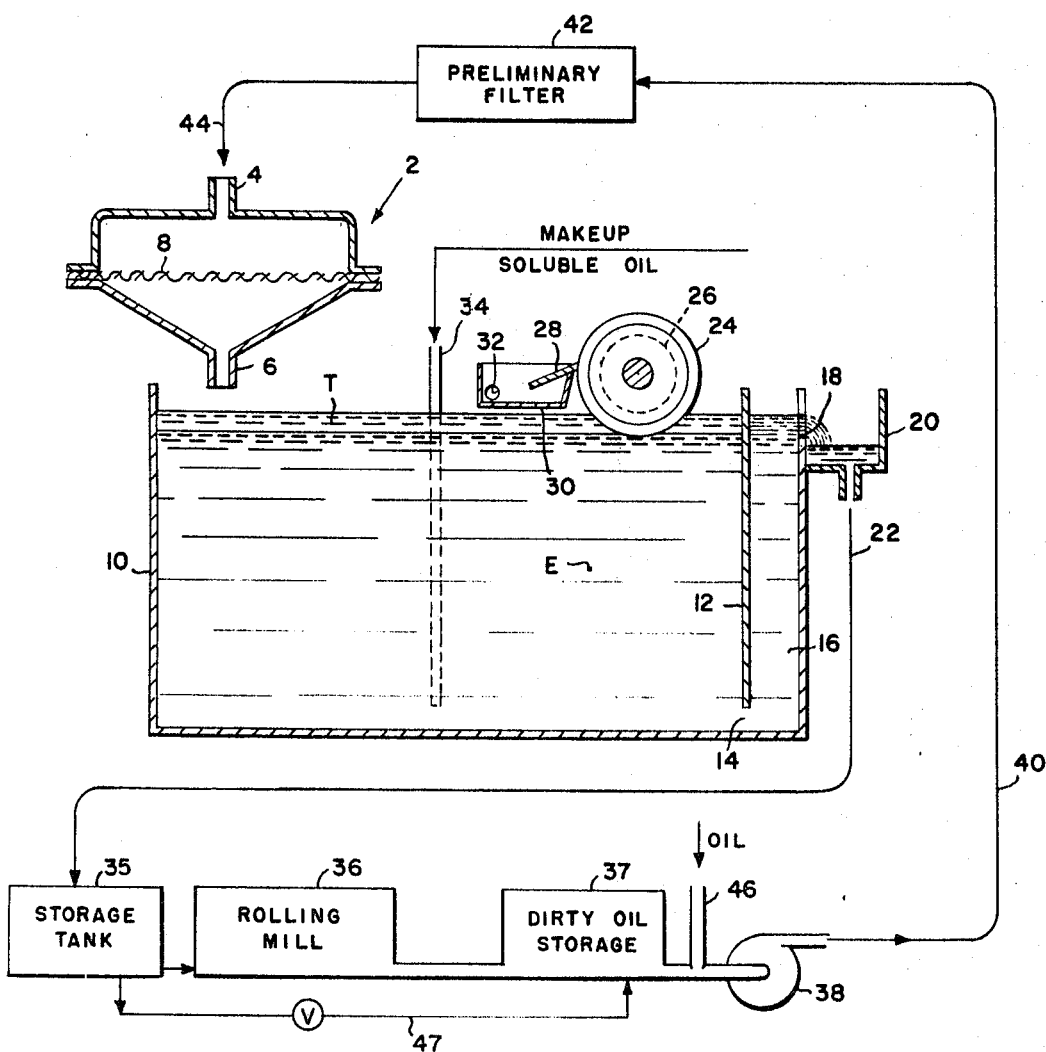

This invention relates to a method and apparatus for separation of oil from aqueous liquids and particularly for the separation of tramp oil from oil-in-water emulsions, though the invention is more broadly applicable.

In the rolling of sheet metal, cooling and lubricating liquids are used which are emulsions of oil as the disperse phase in water as the continuous phase, there being present suitable emulsifiers. Such an emulsion is generally referred to as a soluble oil, and may typically consist of about 5% of a lubricating oil dispersed in water carrying an emulsifier such as a rosin soap, a petroleum sulfonate, polyethylene oxide derivatives, or the like. Such soluble oils may vary widely in their oil content; the oil may be of many types depending on the results desired (the oil being usually a petroleum oil) and many varieties of emulsifiers may be used. Typically in such a soluble oil the droplets of the dispersed oil range downwardly from about 5 microns in diameter. The dispersions are quite stable though they break down to some extent under the conditions of use.

Considering the use of such a soluble oil in the rolling of aluminum, it becomes contaminated in several ways. First, it is contaminated with oil from hydraulic controls and bearings in the rolling mill. It is further contaminated by oil which separates from the emulsion by reason of its degradation. Oil from these sources becomes suspended in the emulsion without becoming actually emulsified: i.e. droplets of this oil appear in the emulsion ranging in size generally upwards of twenty microns in diameter. In the art, the oil forming these droplets is known as tramp oil. The rather fine dispersion of these droplets is due to the violent agitation which occurs during the rolling operation. The tramp oil droplets will gradually separate and float to the surface of the emulsion if it is held sufficiently long in a detention tank. However, due to the small size of the tramp oil droplets, the removal of the tramp oil by this gradual separation is not desirable because of the long periods of detention required, involving, necessarily, the provision for use in the mill of unduly large quantities of the soluble oil.

There is a second concurrent contamination of the soluble oil due to the accumulation of solids. In the case of the rolling of aluminum, the contaminating solids are largely aluminum and aluminum oxide. These result from the fact that in the rolling operation portions of the surface of the aluminum are removed from the strips or sheets being rolled. Another solid which contaminates the soluble oil is carbon in the form of particles produced by the decomposition of oil at the high temperatures of rolling, for example around 950° F. The carbon particles are particularly undesirable because they may be pressed into the final aluminum sheet. Silica, mill dust and bacteria also accumulate in the soluble oil.

The solid particles which appear in accordance with the foregoing are generally less than ten microns in nominal diameter. Microscopic examination reveals that these solid particles accumulate in the droplets of the tramp oil, with little or none entering the actually emulsified droplets of smaller size in the emulsion. This fact makes possible the removal of the solids with the tramp oil, without such direct filtering as would hold back the solid particles independently of the tramp oil.

As described in the application of McLean and Schneider, Ser. No. 436,791, filed Mar. 3, 1965, it has been found that by passing the contaminated oil through a filtering medium such as a cellulose filter cloth, the original very small droplets of tramp oil coalesce to produce large droplets which readily and rapidly separate from the emulsion, floating to the surface from which they may be skimmed off. From this standpoint of mere separation, there is made unnecessary the provision of a large detention tank in which average detention time is such as to permit the very slow separation of the original droplets. It is further found that the solid particles contaminating the soluble oil and which have sizes ranging downwardly from about ten microns are so retained in the tramp oil that they pass therewith through the filter medium and remain therein so that they separate with the tramp oil. The advantage of this is that the filter medium need not be designed to hold back the solid particles by virtue of a minute pore size. Since they pass through the filter medium, they do not contribute to the formation of a filter cake, and such a cake builds up only very slowly due to much smaller amounts of relatively large particles, primarily dirt which may have entered the soluble oil but which does not have its origin in the same way as the aluminum, aluminum oxide, or carbon particles referred to above. In other words, while the filter medium may ultimately accumulate such a cake as would necessitate its replacement, its useful life is much prolonged even though major amounts of solid particles are removed in the process, with the tramp oil. Accordingly, the filter may operate for long periods of time without shutdown for cleaning. The necessity for cleaning is even further minimized if the filter mentioned is preceded by a coarse filter to remove large dirt particles which would otherwise form a filter cake in the coalescing filter.

Operation in accordance with the foregoing takes place without appreciable degradation of the emulsion itself, the droplets in which, and which form the disperse phase of the emulsion not being coalesced, so that to a major extent the emulsion passes through intact though cleaned.

The general object of the present invention is to improve the process and apparatus just discussed.

When a cloth type filter of the type described in said McLean and Schneider application is used, effective coalescence involves the choice of a cloth or similar filtering medium having relatively small pores, even though sufficiently large to pass the fine particles trapped in the tramp oil. As some larger particles build up a filter cake, the pressure drop through the filter medium required for a given rate of flow increases. Resistance to flow also increases with the viscosity of the tramp oil.

In accordance with the present invention, operation is greatly improved through the use of a filtering medium constituted by a material which is hydrophobic but which is readily wetted by, and therefore retains, the tramp oil. This filtering medium may be described as lipotropic. In particular it is desirable to use, equivalently to each other, either a thin bed of granules of an oil-wettable plastic hydrophobic material or a cloth of such material. When granules are used, they may resemble in size coarse sand, and may be used in a bed having a thickness in the direction of flow of ½ inch or less. If a cloth is used, of polyvinyl chloride, polyvinylidene chloride, or their copolymers (generically constituting sarans), for example, it may be woven, knitted or felted with openings which will pass particles having diameters as large as 250 microns.

Under these conditions various notable advantages are achieved:

First, it will be evident that relatively large particles (up to 250 microns) may pass through the filter so that particles up to this size will not contribute to the formation of the cake. If the coalescing filter is preceded by an ordinary filter capable of removing larger particles, buildup of a cake may be either completely avoided or will be only very gradual, so that the active life of the coalescing filter is very much prolonged.

Secondly, tramp oil, incidentally produced in the rolling process, may be highly viscous and sticky or may be made so by the further introduction of a viscous and sticky oil. The advantage of using such a viscous and sticky oil is that there will be entrapped by the oil not only the fine particles of aluminum, aluminum oxide and carbon, referred to above, but also much larger particles, ranging upwardly to 250 microns, as may appear as incidental dirt. With a less viscous oil such particles might not be entrapped.

Third, much larger droplets of the tramp oil will be produced in the effluent from the filter. This is apparently due to the fact that the hydrophobic but oil-wettable material will have built up on its surfaces and will temporarily retain oil films of considerable thickness, the thickness increasing with the viscosity of the oil. Ultimately such films build up to a point at which they become partially removed by the flow with the production of large droplets which separate much more rapidly in a tank. This action may thus be described as involving oil accumulation in the passages of the medium, which oil is extruded therefrom in the form of droplets considerably exceeding in size those nonemulsified in the original liquid.

Because of the large pore passages which are involved, the pressure drop through the filtering medium is relatively low even when quite viscous oils are involved. Thus satisfactory operating conditions are achieved even when such oils are used to entrap larger particles and in larger quantities such as may be produced by addition of oil to facilitate particle entrapment, particularly of particles of larger size. This action occurs without degradation of the emulsion, the oil in the disperse phase thereof not coalescing, at least to any substantial degree, with the tramp oil. The result of this operation is that the tramp oil, now in relatively large droplets, will readily and promptly separate from the emulsion by floating to the top thereof. A layer of the tramp oil containing the fine solids will thus float on the emulsion and must be removed by skimming.

While skimming may be effected intermittently, in accordance with the present invention continuous and highly effective skimming is provided. In brief, this is accomplished by provision of a roller having a Teflon (polytetrafluoroethylene) surface dipping into the separated layer of the tramp oil. The Teflon is readily wetted by the tramp oil (being lipotropic) but is highly repellent to water (hydrophobic), so that as the Teflon roller rotates it carries a film of the tramp oil and its trapped solids out of the separating tank, and this film may be scraped off the roller by means of a doctor blade, the scraped-off tramp oil passing to a suitable trough from which it is discarded or possibly fed to a filter to remove the solids and recover the oil. While Teflon is the preferred material for the surface of the roller, other materials to which oil adheres but which are repellent of water may be used such as polypropylene, polyethylene, polyvinyl chloride, polyvinylidene chloride, copolymers of the last, or the like. By reason of the hydrophobic action, the soluble oil, which has the wetting properties of water, is repelled and not removed by the roller. Furthermore, the skimming arrangement does not produce any appreciable degradation of the emulsion.

Figure 2:
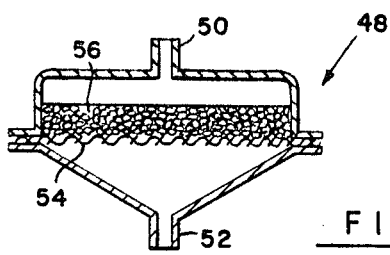

The general objects of the invention relate to the achievement of the foregoing advantageous results and these and others relating to details of construction and operation will become more apparent from the following description, read in conjunction with the accompanying drawing, in which:

FIGURE 1 is a diagrammatic and vertical section illustrating one embodiment of the invention; and FIGURE 2 is a fragmentary section showing an alternative type of coalescing filter.

The coalescing filter in FIGURE 1 is conventionalized at 2 as comprising a chamber provided with an inlet passage 4 and an outlet passage 6 within which there is mounted the filter medium 8 comprising, in this instance, a fabric, for example, of polyvinyl chloride, polyvinylidene chloride, or their copolymers (saran) of woven or knitted type. This cloth desirably has pores which may vary widely in size but may range upwardly to a size capable of passing 250 micron particles. The filter may be of numerous conventional types so far as support and mounting of the filter cloth medium is concerned: it may take the form of a conventional filter press in which the saran cloth is substituted for the usual, e.g., cellulosic, sheets of filtering medium; or it may comprise metallic cylindrical screens supporting exteriorly the cloth in the form of bags, the flow being inward into the tubes and from them to a collecting chamber. One form of filter press which may be used is that described in my application Ser. No. 375,049, filed June 15, 1964, now abandoned, the sheets of filter cloth being, in the present instance, of a saran having the characteristics just indicated.

The particular saran used is not important; all have similar properties with respect to oil-wettability and, therefore oil-retention, and with respect to water-repulsion.

The outlet 6 of the filter discharges effluent into the tank 10 in which the tramp oil T carrying fine particles separates by flotation to the surface of the emulsion E which is not appreciably degraded by the passage through the filter. The tank 10 may be the supply tank for the soluble oil, i.e., the oil-in-water emulsion, though it may be an auxiliary smaller tank.

The tank and skimmer arrangement may be as described in my application Ser. No. 436,788, filed Mar. 3, 1965. Within the tank is a baffle 12 which defines with one of the tank walls a chamber 16 into which the emulsion may flow through an opening 14 at the lower end of the baffle. The emulsion flowing upwardly in the chamber 16 overflows a weir 18 (maintaining liquid level approximately constant) into a receiving trough 20 from which delivery of the soluble oil takes place through connection 22. For the purpose of skimming off the separated and floating tramp oil T carrying solids, a roller 24 faced with Teflon (polytetrafluoroethylene) is mounted to rotate and dip into the tramp oil and the upper portion of the emulsion, the roller being driven at a suitable low speed by means of a motor 26 including reduction gearing. The roller may be faced with other material than Teflon, though this is most satisfactory, suitable other materials being polyethylene, polypropylene, polyvinyl chloride, polyvinylidene chloride, copolymers of the latter, or the like. All of these are hydrophobic but wettable by oil so that the tramp oil is carried out of the tank 10 as the roller rotates in a counterclockwise direction. A doctor blade 28 scrapes off the carried film of oil, delivering it into a trough 30 from which it may pass through the outlet opening 32. If it is desired to recover the oil free of suspended solids, the oil from the trough 30 may be passed through a suitable filter. The cleaned oil thus recovered may be reintroduced into the system as described later.

Soluble oil makeup may be introduced into the tank 10 through the pipe 34.

Considering the apparatus and process applied to the rolling of metals such as aluminum or steel, the recovered soluble oil passes through conduit 22 to a clean oil storage tank 35 from which it is delivered, as required, to the rolling mill 36 which need not be described in detail since such a rolling mill is quite conventional, provision being made as usual for the distribution of the soluble oil to the metal being rolled in conventional fashion. The demand of soluble oil by the rolling mill is usually intermittent and the tank 35 is of a size to accommodate the demand. The soluble oil from the rolling mill is delivered to a dirty oil storage tank 37 and thence by pump 38 to the conduit 40 from which it may desirably flow through a preliminary filter 42 capable of removing larger solid particles which will not pass freely through the filter medium 8. The preliminary filter 42 delivers the effluent, but still contaminated, soluble oil through conduit 44 to the inlet 4 of the filter 2.

In some instances the tramp oil which may enter the soluble oil in the rolling mill may not be sufficient in quantity to entrap the solids, particularly if large quantities of these solids are produced. In such case it is desirable to add additional oil through a connection such as 46. If relatively larger particles are included, it is advantageous to introduce at this point a quite viscous and sticky oil which, in the agitation produced by the pump 38, will entrap larger solid particles and hold them throughout the remainder of the flow.

The preliminary filter 42 may or may not be used depending on the size ranges of the solid material which may appear in the line 40. Assuming that the filter medium 8 will pass particles up to the 250 micron size, the preliminary filter may have a filtering medium therein such as a cloth or the like which will remove larger particles. In such case build up of filter cake on the medium 8 may be prevented entirely or may be quite slow. If any coalescence of tramp oil occurs in passage through this preliminary filter that is not detrimental.

Since flow of the soluble oil from the rolling mill is intermittent and it is desirable that flow through the coalescing filter should be continuous, it is desirable to maintain in the tank 37 a supply for circulation through the filter and this may be accomplished by flow (gravity or pumped) through a valved connection 47 from tank 35. As will be evident from the foregoing, the roller removes continuously the tramp oil in the floating layer, and does this without deterioration of the soluble oil emulsion.

The operation of the coalescing filter 2 involves the buildup of a film of the tramp oil containing the solids, and when the buildup occurs to a substantial thickness the flow will drive droplets of the tramp oil from the medium 8 to which it had adhered. This action may be described as involving the oil accumulated in the medium passages being extruded therefrom in the form of droplets. These droplets are large in size and readily separate to form the layer T in the tank 10, floating on the emulsion E which is substantially free of the tramp oil. If the tramp oil is in itself of a sticky nature or has stickiness augmented by the addition of oil at 46, size of the droplets is increased leading to better entrapment of larger particles and more ready separation in the tank 10 which then need provide only a very short detention time for the separation and accordingly may be small.

Alternative to the use of a cloth such as that described and which may be formed of a saran, a polyethylene, a polypropylene, or the like, the same material may be used in the form of granules in a filter conventionalized at 48. This filter comprises a housing having an inlet passage 50 and and outlet passage 52 provided with a supporting screen such as 54 for a thin bed 56 of the oil-retaining particles of the hydrophobic, oil-wettable plastic. It has been found that these particles may desirably correspond in size to coarse sand, the bed of the granular material being relatively thin, desirably ¼ inch to ½ inch in thickness. Its function is essentially that of the cloth already described:

The oil accumulates until the films thereof become unstable and break off to flow outwardly as large droplets. If the bed is thin in the direction of flow there is little buildup of back pressure.

Since the absorption of the tramp oil is a surface action, the granules used need not be of the plastic material throughout, but inert granules of sawdust, sand, or the like may be coated with the plastic or resin for use.

Intermediate between the use of a woven or knitted cloth and the use of a bed of plastic granules as described, there is a possibility of use of a mat or batting of fibers of the same type of materials more or less felted into a loose cloth having the advantage of ease of handling as a unit.

The operation involved in accordance with the present invention is quite different from that which occurs when there is used a bed of oil-wettable water-repellent material of considerable thickness as disclosed in the application of McLean, Ser. No. 436,789, filed Mar. 3, 1965. If the bed, constituted by granules, or a cloth is of substantial thickness so that long paths of flow of the liquid through the bed are presented, the buildup of oil wetting the granule surfaces tends to choke the passages so that the oil is not effectively discharged from the bed. Instead, the oil remains to a major extent in the bed which loses its effectiveness and must be regenerated by backwashing with an oil solvent. This is especially true if the accumulated oil is viscous. In contrast, in accordance with the present invention which utilizes a shallow granular bed or cloth offering small thickness in the direction of flow, as the oil accumulates and forms a thickened film the film becomes unstable under flow conditions and portions become detached flowing outwardly as the larger more easily separable droplets. In effect, then, the coalescing medium is self-cleaning and this is true even though the accumulated oil has high viscosity and even though the entrapped particles are large, up to the size capable of passing through the pores or flow passages.

While the invention has been particularly described in its use for removing tramp oil and trapped solids from an oil-in-water emulsion such as soluble oil, it will be evident that it may be equally applied to the separation of oil from other aqueous liquids, not necessarily emulsions. In such cases oil may be introduced solely for the removal of solids, even though oil is not inherently present as the result of some other processing.

Various modifications may be made carrying out the invention, and it will be understood that its scope is not limited except as required by the following claims.

What is claimed is:

1. Apparatus, for the separation of nonemulsified suspended oil droplets from an emulsion of an oil as the dispersed phase in an aqueous continuous phase, comprising a support, a pervious separating medium carried by the support, said separating medium providing numerous liquid flow passages therethrough bounded by surfaces of an oil-retaining water-repellent material, said passages being of short length in the direction of flow so that oil after accumulation therein is extruded therefrom in the form of droplets considerably exceeding in size those nonemulsified in the original liquid, means directing the liquid to be separated to said medium for flow through the passages, and a receptacle receiving effluent from said medium to provide for gravity flotation of said larger droplets.

2. Apparatus according to claim 1 in which the surfaces bounding said passages are provided by a polymeric resin.

3. Apparatus according to claim 1 in which the surfaces bounding said passages are provided by polytetrafluoroethylene.

4. Apparatus according to claim 1 in which said medium is a fabric of a polymeric resin.

5. Apparatus according to claim 1 in which said medium is a fabric of a resin of the group consisting of polyvinyl chloride, polyvinylidene chloride, and their copolymers.

6. Apparatus, for the separation of nonemulsified suspended oil droplets from an emulsion of an oil as the dispersed phase in an aqueous continuous phase, comprising a support, a pervious separating medium carried by the support, said separating medium providing numerous liquid flow passages therethrough bounded by surfaces of an oil-retaining water-repellent material, said passages being of short length in the direction of flow so that oil after accumulation therein is extruded therefrom in the form of droplets considerably exceeding in size those nonemulsified in the original liquid, means directing the liquid to be separated to said medium for flow through the passages, a receptacle receiving effluent from said medium to provide for gravity flotation of said larger droplets, and means for skimming the floated oil from the surface of liquid in the receptacle, said skimming means comprising a roller mounted to dip into the surface of said liquid and faced with an oil-retaining water-repellent material, means for rotating said roller about its axis, and means for scraping adherent oil from said roller.

7. The method, for the separation of nonemulsified suspended oil droplets from an emulsion of an oil as the dispersed phase in an aqueous continuous phase, comprising passing such emulsion containing the nonemulsified droplets through a separating medium providing numerous liquid flow passages therethrough bounded by surfaces of an oil-retaining water-repellent material, said passages being of short length in the direction of flow so that oil after accumulation therein is extruded therefrom in the form of droplets considerably exceeding in size those nonemulsified in the original liquid, and then effecting in the effluent from said medium gravity flotation of said larger droplets.

8. The method, for the separation of nonemulsified suspended oil droplets from an emulsion of an oil as the dispersed phase in an aqueous continuous phase, comprising passing such emulsion containing the nonemulsified droplets through a separating medium providing numerous liquid flow passages therethrough bounded by surfaces of an oil-retaining water-repellent polymeric resin, said passages being of short length in the direction of flow so that oil after accumulation therein is extruded therefrom in the form of droplets considerably exceeding in size those nonemulsified in the original liquid, and then effecting in the effluent from said medium gravity flotation of said larger droplets.

9. The method, for the separation of nonemulsified suspended oil droplets from an emulsion of an oil as the dispersed phase in an aqueous continuous phase, comprising passing such emulsion containing the nonemulsified droplets through a separating medium providing numerous liquid flow passages therethrough bounded by surfaces of an oil-retaining water-repellent polytetrafluoroethylene, said passages being of short length in the direction of flow so that oil after accumulation therein is extruded therefrom in the form of droplets considerably exceeding in size those nonemulsified in the original liquid, and then effecting in the effluent from said medium gravity flotation of said larger droplets.

10. The method, for the separation of nonemulsified suspended oil droplets from an emulsion of an oil as the dispersed phase in an aqueous continuous phase, comprising passing such emulsion containing the nonemulsified droplets through a separating medium providing numerous liquid flow passages therethrough bounded by surfaces of an oil-retaining water-repellent material in the form of a fabric of a polymeric resin, said passages being of short length in the direction of flow so that oil after accumulation therein is extruded therefrom in the form of droplets considerably exceeding in size those nonemulsified in the original liquid, and then effecting in the effluent from said medium gravity flotation of said larger droplets.

11. The method, for the separation of nonemulsified suspended oil droplets from an emulsion of an oil as the dispersed phase in an aqueous continuous phase, comprising passing such emulsion containing the nonemulsified droplets through a separating medium providing numerous liquid flow passages therethrough bounded by surfaces of an oil-retaining water-repellent material in the form of a fabric of a resin of the group consisting of polyvinyl chloride, polyvinylidene chloride, and their copolymers, said passages being of short length in the direction of flow so that oil after accumulation thereon is extruded therefrom in the form of droplets considerably exceeding in size those nonemulsified in the original liquid, and then effecting in the effluent from said medium gravity flotation of said larger droplets.

12. Apparatus, for the separation, from a mixture, of nonemulsified oil droplets from an aqueous liquid in which they are suspended, comprising a support, a pervious separating medium carried by the support, said separating medium providing numerous liquid flow passages therethrough bounded by surfaces of an oil-retaining water-repellent material, said passages being of short length in the direction of flow so that oil after accumulation therein is extruded therefrom in the form of droplets considerably exceeding in size those nonemulsified but suspended in the original mixture, means directing the mixture to be separated to said medium for flow through the passages, and a receptacle receiving effluent from said medium to provide for gravity flotation of said larger droplets.

13. Apparatus according to claim 12 in which the surfaces bounding said passages are provided by a polymeric resin.

14. Apparatus according to claim 12 in which the surfaces bounding said passages are provided by polytetrafluoroethylene.

15. Apparatus according to claim 12 in which said medium is a fabric of a polymeric resin.

16. Apparatus according to claim 12 in which said medium is a fabric of a resin of the group consisting of polyvinyl chloride, polyvinylidene chloride, and their copolymers.

17. Apparatus, for the separation, from a mixture, of nonemulsified oil droplets from an aqueous liquid in which they are suspended, comprising a support, a pervious separating medium carried by the support, said separating medium providing numerous liquid flow passages therethrough bounded by surfaces of an oil-retaining water-repellent material, said passages being of short length in the direction of flow so that oil after accumulation therein is extruded therefrom in the form of droplets considerably exceeding in size those nonemulsified but suspended in the original mixture, means directing the mixture to be separated to said medium for flow through the passages, a receptacle receiving effluent from said medium to provide for gravity flotation of said larger droplets, and means for skimming the floated oil from the surface of the effluent in the receptacle, said skimming means comprising a roller mounted to dig into the surface of said effluent and faced with an oil-retaining water-repellent material, means for rotating said roller about its axis, and means for scraping adherent oil from said roller.

18. The method, for the separation, from a mixture, of nonemulsified oil droplets from an aqueous liquid in which they are suspended, comprising passing such mixture containing the nonemulsified droplets through a separating medium providing numerous liquid flow passages therethrough bounded by surfaces of an oil-retaining water-repellent material, said passages being of short length in the direction of flow so that oil after accumulation thereof is extruded therefrom in the form of droplets considerably exceeding in size those nonemulsified but suspended in the original mixture, and then effecting in the effluent from said medium gravity flotation of said larger droplets.

19. The method, for the separation, from a mixture, of nonemulsified oil droplets from an aqueous liquid in which they are suspended, comprising passing such mixture containing the nonemulsified droplets through a separating medium providing numerous liquid flow passages therethrough bounded by surfaces of an oil-retaining water repellent polymeric resin, said passages being of short length in the direction of flow so that oil after accumulation thereon is extruded therefrom in the form of droplets considerably exceeding in size those nonemulsified but suspended in the original mixture, and then effecting in the effluent from said medium gravity flotation of said larger droplets.

20. The method, for the separation, from a mixture, of nonemulsified oil droplets from an aqueous liquid in which they are suspended, comprising passing such mixture containing the nonemulsified droplets through a separating medium providing numerous liquid flow passages therethrough bounded by surfaces of an oil-retaining water-repellent polytetrafluoroethylene, said passages being of short legnth in the direction of flow so that oil after accumulation thereon is extruded therefrom in the form of droplets considerably exceeding in size those nonemulsified but suspended in the original mixture, and then effecting in the effluent from said medium gravity flotation of said larger droplets.

21. The method, for the sepaartion, from a mixture, of nonemulsified oil droplets from an aqueous liquid in which they are suspended, comprising passing such mixture containing the nonemulsified droplets through a separating medium providing numerous liquid flow passages therethrough bounded by surfaces of an oil-retaining water-repellent material in the form of a fabric of a polymeric resin, said passages being of short length in the direction of flow so that oil after accumulation thereon is extruded in the form of droplets considerably exceeding in size those nonemulsified but suspended in the original mixture, and then effecting in the effluent from said medium gravity flotation of said larger droplets.

22. The method, for the separation, from a mixture, of nonemulsified oil droplets from an aqueous liquid in which they are suspended, comprising passing such mixture containing the nonemulsified droplets through a separating medium providing numerous liquid flow passages therethrough bounded by surfaces of an oil-retaining water-repellent material in the form of a fabric of a resin of the group consisting of polyvinyl chloride, polyvinylidene chloride, and their coplymers, said passages being of short length in the direction of flow so that oil after accumulation thereon is extruded therefrom in the form of droplets considerably exceeding in size those nonemulsified but suspended in the original mixture, and then effecting in the effluent from said medium gravity flotation of said larger droplets.

23. The method, for the separation, from a mixture, of nonemulsified oil droplets and fine solid particles from an aqueous liquid in which they are suspended, comprising passing such mixture containing the nonemulsified droplets and said solid particles through a separating medium providing numerous liquid flow passages therethrough bounded by surfaces of an oil-retaining water-repellent material, said passages being of short length in the direction of flow and being of a size to pass freely said solid particles so that oil after accumulation therein is extruded therefrom in the form of droplets entrapping said solid particles and considerably exceeding in size those nonemulsified but suspended in the original mixture, and then effecting in the effluent from said medium gravity flotation of said larger droplets containing the solid particles.

24. The method, for the separation, from a mixture, of nonemulsified oil droplets and fine solid particles from an aqueous liquid in which they are suspended, comprising passing such mixture containing the nonemulsified droplets and said solid particles through a separating medium providing numerous liquid flow passages therethrough bounded by surfaces of an oil-retaining water-repellent polymeric resin, said passages being of short length in the direction of flow and being of a size to pass freely said solid particles so that oil after accumulation therein is extruded therefrom in the form of droplets entrapping said solid particles and considerably exceeding in size those nonemulsified but suspended in the original mixture, and then effecting in the effluent from said medium gravity flotation of said larger droplets containing the solid particles.

25. The method, for the separation, from a mixture, of nonemulsified oil droplets and fine solid particles from an aqueous liquid in which they are suspended, comprising passing such mixture containing the nonemulsified droplets and said solid particles through a separating medium providing numerous liquid flow passages therethrough bounded by surfaces of an oil-retaining water-repellent polytetrafluoroethylene, said passages being of short length in the direction of flow and being of a size to pass freely said solid particles so that oil after accumulation therein is extruded therefrom in the form of droplets entrapping said solid particles and considerably exceeding in size those nonemulsified but suspended in the original mixture, and then effecting in the effluent from said medium gravity flotation of said larger droplets containing the solid particles.

26. The method, for the separation, from a mixture, of nonemulsified oil droplets and fine solid particles from an aqueous liquid in which they are suspended, comprising passing such mixture containing the nonemulsified droplets and said solid particles through a separating medium providing numerous liquid flow passages therethrough bounded by surfaces of an oil-retaining water-repellent material in the form of a fabric of a polymeric resin, said passages being of short length in the direction of flow and being of a size to pass freely said solid particles so that oil after accumulation therein is extruded therefrom in the form of droplets entrapping said solid particles and considerably exceeding in size those nonemulsified but suspended in the original mixture, and then effecting in the effluent from said medium gravity flotation of said larger droplets containing the solid particles.

27. The method, for the separation, from a mixture, of nonemulsified oil droplets and fine solid particles from an aqueous liquid in which they are suspended, comprising passing such mixture containing the nonemulsified droplets and said solid particles through a separating medium providing numerous liquid flow passages therethrough bounded by surfaces of an oil-retaining water-repellent material in the form of a fabric of a polymeric resin having openings capable of passing particles up to approximately 250 microns in size, said passages being of short length in the direction of flow and being of a size to pass freely said solid particles so that oil after accumulation therein is extruded therefrom in the form of droplets entrapping said solid particles and considerably exceeding in size those nonemulsified but suspended in the original mixture, and then effecting in the effluent from said medium gravity flotation of said larger droplets containing the solid particles.

28. The method, for the separation, from a mixture, of nonemulsified oil droplets and fine solid particles from an aqueous liquid in which they are suspended, comprising passing such mixture containing the nonemulsified droplets and said solid particles through a separating medium providing numerous liquid flow passages therethrough bounded by surfaces of an oil-retaining water-repellent material in the form of a fabric of a resin of the group consisting of polyvinyl chloride, polyvinylidene chloride, and their copolymers, said passages being of short length in the direction of flow and being of a size to pass freely said solid particles so that oil after accumulation therein is extruded therefrom in the form of droplets entrapping said solid particles and considerably exceeding in size those nonemulsified but suspended in the original mixture, and then effecting in the effluent from said medium gravity flotation of said larger droplets containing the solid particles.

29. Apparatus, for the separation of nonemulsified suspended oil droplets from an emulsion of an oil as the dispersed phase in an aqueous continuous phase, comprising a support, a pervious separating medium carried by the support, said separating medium providing numerous liquid flow passages therethrough, said passages being of short length in the direction of flow so that oil after accumulation therein is extruded therefrom in the form of droplets considerably exceeding in size those nonemulsified in the original liquid, means directing the liquid to be separated to said medium for flow through the passages, a receptacle receiving effluent from said medium to provide for gravity flotation of said larger droplets, and means for skimming the floated oil from the surface of liquid in the receptacle, said skimming means comprising a roller mounted to dip into the surface of said liquid and faced with an oil-retaining water-repellent material, means for rotating said roller about its axis, and means for scraping adherent oil from said roller.

30. Apparatus according to claim 29 in which the oil-retaining water-repellent material facing the roller is polytetrafluoroethylene.

31. Apparatus, for the separation of nonemulsified suspended oil droplets and fine solid particles from an emulsion of an oil as the dispersed phase in an aqueous continuous phase, comprising a support, a pervious separating medium carried by the support, said separating medium providing numerous liquid flow passages therethrough, said passages being of short length in the direction of flow and of a size to pass freely said solid particles so that oil with entrapped solid particles after accumulation therein is extruded therefrom in the form of droplets considerably exceeding in size those nonemulsified in the original liquid, means directing the liquid to be separated to said medium for flow through the passages, a receptacle receiving effluent from said medium to provide for gravity flotation of said larger droplets containing entrapped solid particles, and means for skimming the floated oil with its entrapped solid particles from the surface of liquid in the receptacle, said skimming means comprising a roller mounted to dip into the surface of said liquid and faced with an oil-retaining water-repellent material, means for rotating said roller about its axis, and means for scraping adherent oil from said roller.

32. Apparatus according to claim 31 in which the oil-retaining water-repellent material facing the roller is polytetrafluoroethylene.

References Cited

UNITED STATES PATENTS

| | | | |
|---|---|---|---|
| 1,658,362 | 2/1928 | Walker | 210—73 |
| 1,947,709 | 2/1934 | Garrison. | |
| 2,551,175 | 5/1951 | Smith. | |
| 2,588,794 | 3/1952 | Barton | 210—83 X |
| 2,611,490 | 9/1952 | Robinson | 210—321 X |
| 2,746,607 | 5/1956 | Hess | 210—314 X |
| 3,004,672 | 10/1961 | Conley | 210—525 |
| 3,146,192 | 8/1964 | McClintock | 210—525 X |
| 3,256,997 | 6/1966 | Pall. | |
| 3,265,212 | 8/1966 | Bonsall | 210—73 |

FOREIGN PATENTS 390,989    4/1933    Great Britain.

MORRIS O. WOLK, Primary Examiner

S. MARANTZ, Assistant Examiner

U.S. Cl. X.R.

210—83, 295, 500, 525; 252—360